(12) United States Patent
Thomas

(10) Patent No.: US 7,027,659 B1
(45) Date of Patent: Apr. 11, 2006

(54) METHOD AND APPARATUS FOR GENERATING VIDEO IMAGES

(75) Inventor: David R. Thomas, Opio (FR)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/315,247

(22) Filed: May 20, 1999

(30) Foreign Application Priority Data

May 20, 1998 (EP) .................................. 98401228

(51) Int. Cl.
*G06K 9/40* (2006.01)
(52) U.S. Cl. ...................................... 382/254; 382/260
(58) Field of Classification Search ........ 382/254–255, 382/260–269; 358/1.9
See application file for complete search history.

(56) References Cited

U.S. PATENT DOCUMENTS 5,629,752 A * 5/1997 Kinjo ........................... 355/35

FOREIGN PATENT DOCUMENTS

JP  2001208524 A  *  8/2001

OTHER PUBLICATIONS

Omura et al: "3D Display with Accomodative Compensation (3DDAC) Employing Real-Time Gaze Detection", SID Internationa Symposium, Digest of Technical Papers, San Diego, May 12-17, 1996, vol. 27, pp. 889-892.*

* cited by examiner

*Primary Examiner*—Thomas D Lee
*Assistant Examiner*—Stephen Brinich
(74) *Attorney, Agent, or Firm*—Wade James Brady III; Frederick J. Telecky, Jr.

(57) ABSTRACT

A method and system for generating a video image is disclosed in which an object is monitored with a video camera to produce a sequence of video frames. Each of the video frames is divided into a plurality of regions, each region being representative of a portion of said object. For example, the frame of the video image may include the head and shoulder region of a user. Regions corresponding to predetermined facial features may be selected, such as the chin, opposing edges of the mouth, the nose, and the outer edge of each eye. At least one of the plurality of regions is selected. In the illustrative example, the selected region may comprise the mouth of the monitored user. The selected region is then recombined with each of the remaining regions of the video frame to form a display video image. The sequence of video frames is then displayed such that the selected region is perceived by an observer to form a sharp image, and remaining regions of said display video image are less sharp in accordance with the distance between said respective portion of said object and said video camera.

25 Claims, 13 Drawing Sheets

1

METHOD AND APPARATUS FOR GENERATING VIDEO IMAGES

FIELD OF THE INVENTION

The present invention relates generally to the field of video images, and more particularly to a method and apparatus for generating video images that are perceived by the observer to be three-dimensional.

BACKGROUND OF THE INVENTION

Many systems for generating pseudo three-dimensional (3D) images have been developed over recent years. Generally, these systems can be characterised by the methods by which the observer is deceived into perceiving the image as three-dimensional (i.e. having depth).

In the real-world, the human eye perceives depth in an image due to the combination of a number of visual cues.

With the first visual cue, more distant objects are perceived by the observer to be both smaller and higher in the field of view, than objects that are closer to the observer. Typically, distant objects are also blocked from the observer's field of view by closer objects and the observer perceives the resolution, contrast, and brightness to be less well defined.

With the second visual cue the observer perceives an apparent change in the position of the object relative to the more distant background image as his own position changes. This effect is known as parallax and can effect the image perceived by the observer in both the horizontal and vertical planes.

With the third visual cue the lateral separation of the observer's eyes means that the distance between a point on an object and each eye can be different. This effect is known in the art as binocular disparity and results in each eye observing a slightly different perspective. However, in real-life, this effect is resolved by the human brain to produce the single clear image perceived by the observer.

The fourth visual cue to three-dimensional perception of video images is depth disparity. Since the human eye has a finite field of view in both the horizontal and vertical planes, the eye tends to focus on an object, or region of an object, that is of immediate interest. Consequently, surrounding objects, or regions of the object, which form the background image are out of focus and blurred. The human brain perceives these surrounding objects or regions to be at a different distance to provide a depth cue.

Known stereoscopic and auto-stereoscopic systems for generating pseudo three-dimensional images, generate alternate and slightly differing frames of the video image for each eye. The different frames are intended to correspond to the different views perceived by the human brain due to the separation between the eyes, and produce a binocular disparity.

The observer of a video image generated using a stereoscopic system must be provided with an optical device such as a pair of spectacles having one red lens and one green lens. A separate frame of the video image is shown alternately for each eye and at sufficient frequency that the observer resolves a single image.

Auto-stereoscopic systems were developed to produce video images with multiple image planes (i.e. the observer can view around foreground objects). These auto-stereoscopic systems are designed to focus separate frames of the image into each eye using an arrangement of optical elements. Typically, these elements will include vertically aligned lenticular lenses. These systems have found application in items such as postcards, but their more widespread use is limited by the narrow field of view.

As the observer of a stereoscopic or auto-stereoscopic image changes their point of focus, either by looking from one object to another, or by looking at a different region of the object, the eyes must readjust. Each eye will take a finite period to adjust to the focal plane associated with the object perceived by the observer. Therefore, the focal plane of the image perceived by each eye may differ and the human brain must converge the images into a single focused image of the object (known in the art as Convergence).

Similarly, the human eye has a finite depth of focus, or region in space in which the focus of an object can be resolved. This is due to the physical requirement for the cornea to change shape to produce a sharp image of the object on the surface of the retina. Therefore, as the observer switches his attention from a distant object to a close object or vice versa, objects outside the field of view become less well defined and blur (known in the art as Accommodation).

Recent research has shown that users of stereoscopic and auto-stereoscopic systems are prone to fatigue, eye-strain, and headaches. It is thought that this can be attributed to the fact that convergence and accommodation of images in the real-world coincide, and hence the human brain interprets muscular actions associated with the control of the cornea to predict that objects are at different distances.

Conversely, in stereoscopic and auto-stereoscopic systems convergence and accommodation occur at different points in space. FIG. 1 illustrates a stereoscopic system for generating three-dimensional video images in which a display screen 10, such as an LCD or CRT display, shows an image 12 of an object. The eyes of the observer 16 are focused on the display 10 producing an accommodation distance $D_a$. However, the object 12 is perceived to be in front of the display 10, and hence the convergence distance $D_c$ at which the image 14 of the object 12 is perceived is between the display 10 (where the object is in focus) and the observer 16.

Since the object 12 is not perceived by the observer 16 to be at the display surface 10, the human brain directs the eyes at the point in space where it predicts the image 14 to be. This results in the human brain being provided with conflicting signals that are indicative of the accommodation and convergence and can result in fatigue, eye strain and headaches.

SUMMARY OF THE INVENTION

Therefore, a need has arisen for a method and apparatus for generating an image that is perceived by the observer to be three-dimensional, and in which the accommodation and convergence of the image substantially coincide thereby alleviating eye strain and fatigue.

Accordingly the present invention provides a method and system for generating a video image. An object is monitored with a video camera to produce a sequence of video frames. Each of the video frames is divided into a plurality of regions, each region being representative of a portion of the object. For example, the frame of the video image may include the head and shoulder region of a user. Regions corresponding to predetermined facial features may be selected, such as the chin, opposing edges of the mouth, the nose, and the outer edge of each eye. Preferably, the frame of the video image is divided into substantially triangular regions or blocks of pixels. The selection of regions of frames of a monitored video image is discussed in co-pending European Patent Application No. 97401772.5 filed 23 Jul. 1997.

At least one of the plurality of regions is selected. In the illustrative example, the selected region may comprise the mouth of the monitored user. The selected region is then recombined with each of the remaining regions of the video frame to form a display video image.

The sequence of video frames is then displayed such that the selected region is perceived by an observer to form a sharp image, and remaining regions of the display video image are less sharp in accordance with the distance between the respective portion of the object and the selected region.

In a further embodiment of the invention video data indicative of each region of the video frames is transmitted to a receiver before one of the plurality of regions is selected. Typically, the selected region will be a region of the frame of the video image defining a foreground object. However, regions of the frame may also be selected by an observer.

In a yet further preferred embodiment of the invention, the region of the video frame is selected according to the position of an object relative to at least one other object monitored by the video camera. Typically, this includes selecting a region of the frame defining an active entity in a monitored event, such as for example, the mouth or eyes of a monitored user.

The video image is divided into a plurality of regions each defining a focal plane, so that each focal plane is representative of a different distance between a respective portion of the object and the video camera.

Preferably, the remaining regions of the frame are de-emphasised according to the distance between a respective portion of the object and the selected region. Greater de-emphasisation is applied to regions of the video image that are representative of portions of the object where there is a greater distance between the respective portion of the object and the selected region than regions of the video image that are representative of portions of the object where there is a smaller distance between the respective portion of the object and the video camera. Therefore, more distant portions of the object are less well defined in the resulting video image.

In a yet further preferred embodiment of the present invention, the selected region of the frame of the video image is recombined with artificially generated simulations of the remaining regions of the video image.

BRIEF DESCRIPTION OF THE DRAWINGS

The present invention will now be further described, by way of example, with reference to the accompanying drawings in which.

DETAILED DESCRIPTION OF THE DRAWINGS

Figure 1:
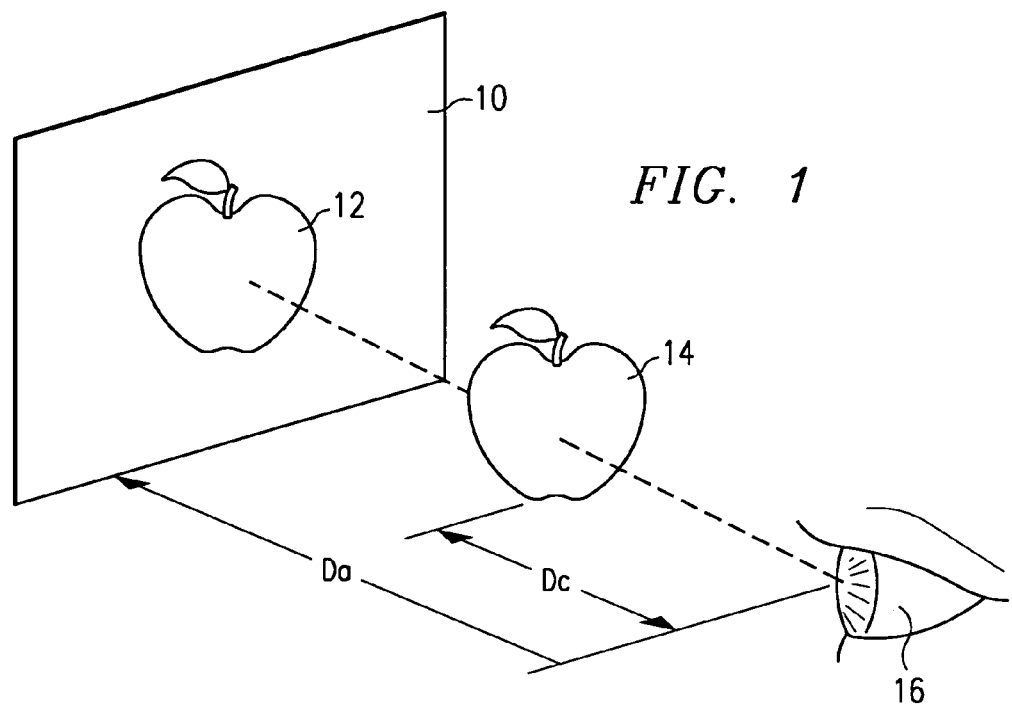
FIG. 1 shows a schematic illustration of a stereoscopic system for generating pseudo three-dimensional video images according to the prior art.
Figure 2A:
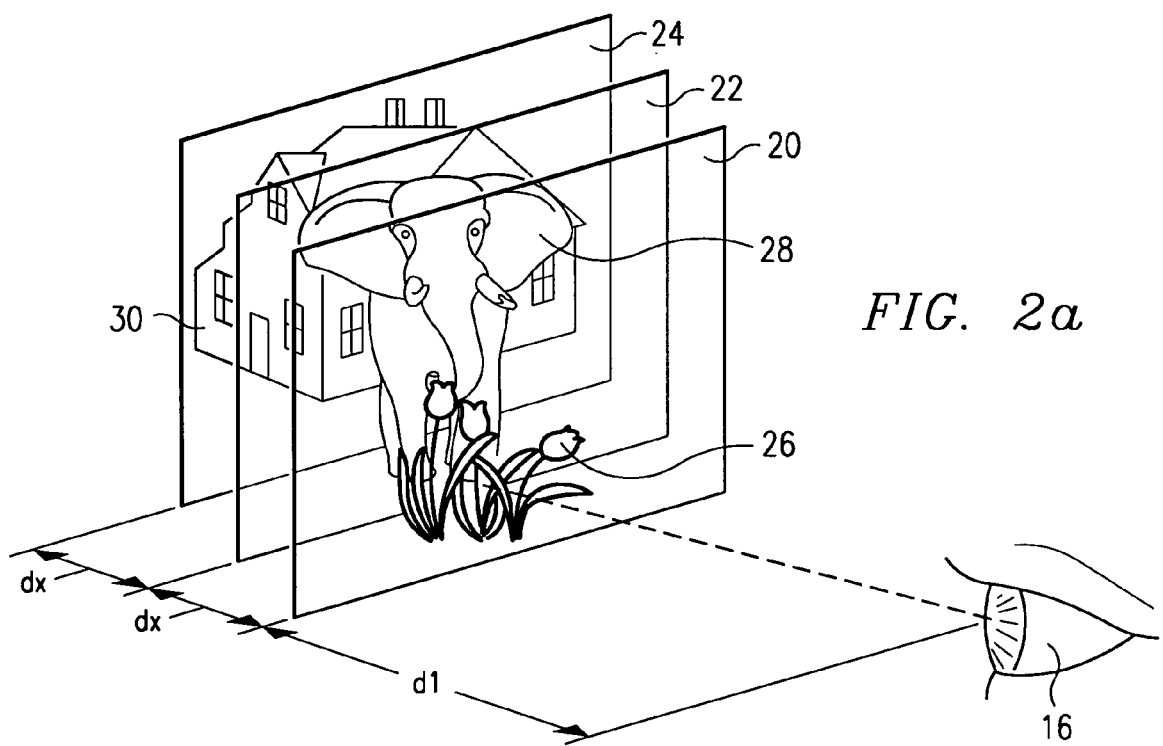
FIGS. 2a–2c shows an array of spaced photographic transparencies for illustrating the principles of the method of the present invention.
Figure 2B:
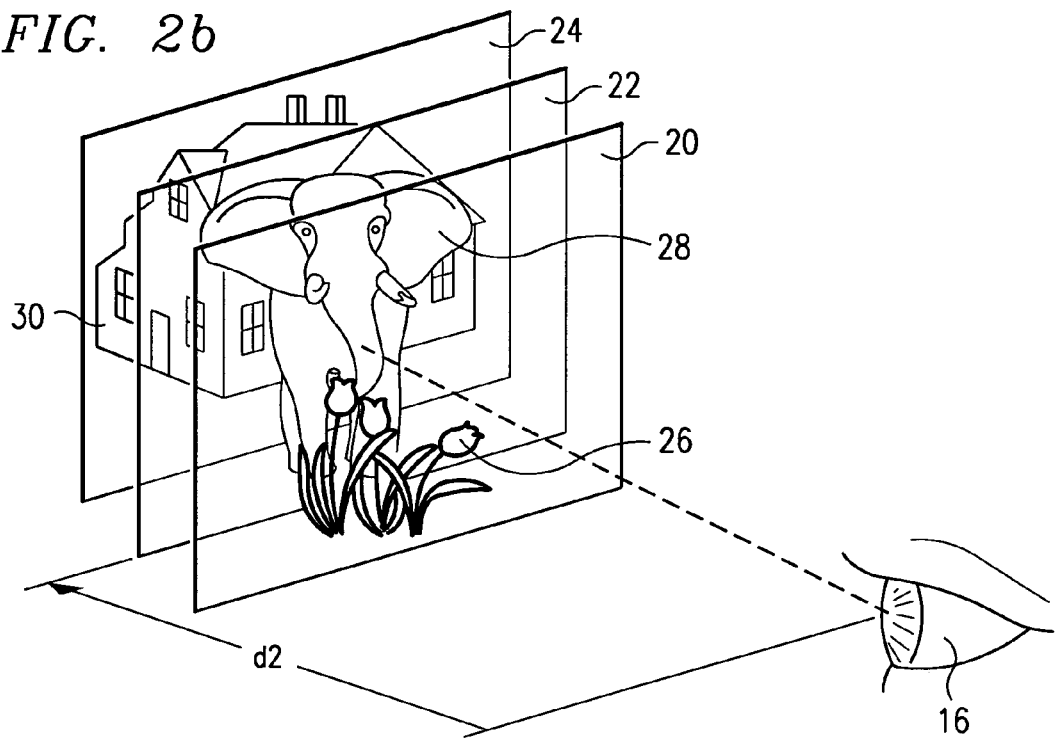
Figure 2C:
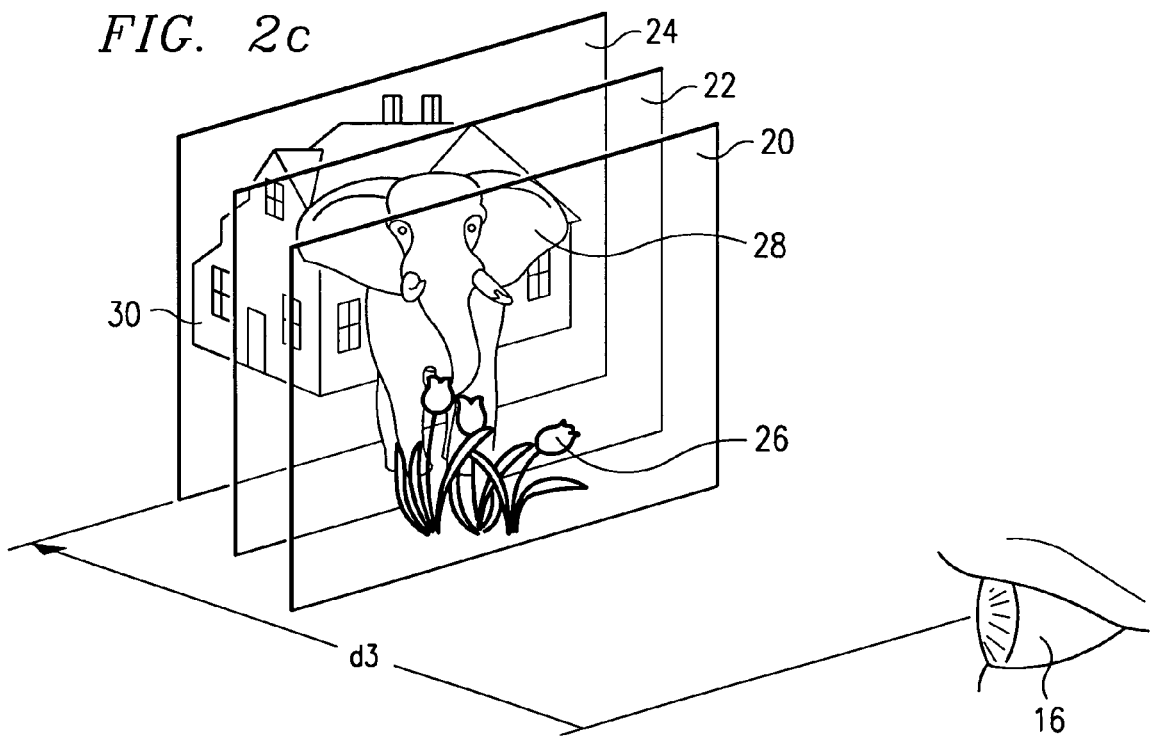

The method of the present invention can be considered analogous to viewing an array of spaced photographic transparencies as illustrated FIGS. 2a–2c. The transparencies (20,22,24) are arranged such that each transparency (20,22,24) is separated from adjacent transparencies (20,22,24) by a distance $d_x$. For the purposes of illustration, each transparency (20,22,24) comprises an image of a different object (26,28,30) and defines an image plane.

It will be appreciated that although the present invention is described in relation to an array of transparencies (20,22,24) each of which represents a different object, the principles disclosed are equally applicable to an array in which each transparency (20,22,24) is representative of a different region of a single object at a predefined distance from the observer.

The first transparency 20 shows an image of an object 26 (i.e. flowers), the second transparency 22 shows an image of object 28 (i.e. an elephant), and the third transparency 24 shows an image of an object 30 (i.e. a building). The first, second and third transparencies (20,22,24) are separated from the observer 16 by distances $d_1$, $d_2$ and $d_3$ respectively.

Referring now to FIG. 2a, when the observer 16 is focused on the object 26 contained in the first transparency 20 the accommodation and convergence distance are equivalent to distance $d_1$. Since the eyes of the observer 16 are focused on the object 26 contained in first transparency 20, the objects (28,30) contained in the second and third transparencies (22,24) are perceived by the observer 16 to be blurred due to depth disparity.

Should the observer 16 switch his attention from the object 26 contained in the first transparency 20, for example by focussing on the object 28 contained in the second transparency 22 (FIG. 2b), the eyes will not immediately focus on the object 28. However, the eyes will focus on the object 28 on completion of a finite acclimatisation period and the accommodation and convergence distance will then be equivalent to distance $d_2$.

When the eyes of the observer 16 are focused on the object 28 contained in second transparency 22 the objects (26,30) contained in the first and third transparencies (20,24) are perceived by the observer 16 to be blurred due to depth disparity. However, since the object 26 contained in the first transparency 20 is in front of the objects (28,30) contained in the second and third transparencies (22,24) the focused image of object 28 may be partially obscured by the object 26 of the first transparency 20. As the observer 16 changes his position relative to the object 26 contained in the first transparency 20, more or less of the object 28 contained in the second transparency 22 may come into the observer's field of view. Similarly, as the observer 16 changes his position/orientation relative to the object 26 contained in the first transparency 20, more or less of the object 30 contained in the third transparency 24 may come into the observer's field of view.

Should the observer 16 switch his attention to the object 30 contained in the third transparency 24, as illustrated in FIG. 2c, the eyes will focus on object 30 following a finite acclimatisation period. Consequently, the accommodation and convergence distance are equivalent to distance $d_3$. The eyes of the observer 16 are then focused on the object 30 contained in the third transparency 24, the objects (26,28) contained in the first and second transparencies (20,22) are perceived by the observer 16 to be blurred due to depth disparity, the object 26 in the first transparency 20 being less well defined than the object 28 in the second transparency 22.

Since the objects (26,28) contained in the first and second transparencies (20,22) are in front of the object 30, it may be partially obscured by the objects (26,28) contained in the first and second transparencies (20,22). As the observer 16 changes his position/orientation relative to the objects (26, 28) contained in the first or second transparency (20,22), more or less of the object 30 contained in the third transparency 24 may come into the observer's field of view.

Effectively, the system is creating a plurality of virtual image planes, so that the image that is in focus can be viewed in free space.

Figure 3:
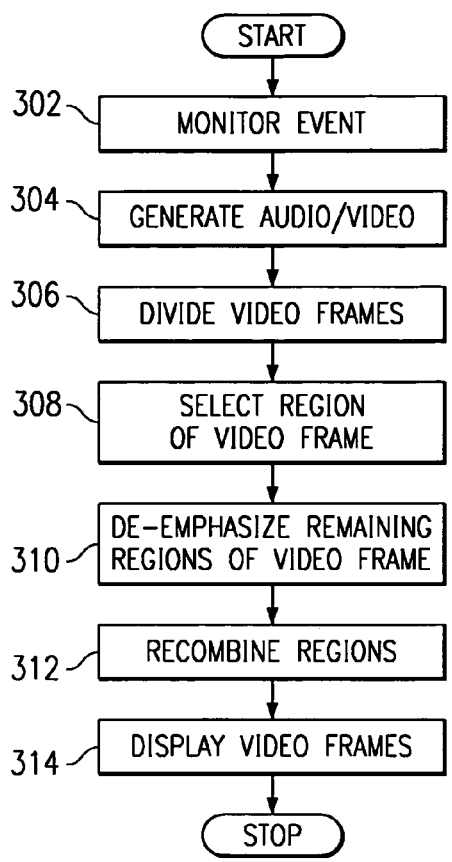
FIG. 3 is a block diagram illustrating the method of the present invention.

FIG. 3 illustrates in block schematic form the method of the present invention. Firstly, an event or scene is monitored using a video camera (Block 302). The video camera generates video data comprising a sequence of video frames, each video frame being indicative of the monitored event at an instant in time (Block 304). The video frame is then divided into a number of regions or blocks of pixels (Block 306).

Generally the video frame will be divided into a predetermined number of regions. Where certain portions of the video frame contain objects or information that require greater definition, the number of pixels in each region or block, or the number of regions or blocks may be increased. Alternatively, where the video frame contains objects or information that require less definition, sub-regions or sub-blocks that are representative of groups of, for example four pixels, can be provided. These sub-regions or sub-blocks enable data transmission or data storage requirements to be alleviated.

Typically, the regions or blocks, and sub-regions or sub-blocks will be selected by a processor. Digital processors (DSP) such as those manufactured by Texas Instruments Incorporated of Dallas Tex. are particulary suitable for such applications. However, the operation of the processor may be overridden by the user where objects of particular importance, for example a white board used in a presentation, are used. Therefore, the video frame may be divided into a plurality of regions of varying size, a greater number of regions being assigned to regions of the video frame that contain objects or information that require greater definition.

In a video conferencing environment, it has been found that observer's of the generated display video images are better able to comprehend audio data (speech) where the facial movements of other users are distinct. Therefore, it is desirable to maintain and even enhance the resolution of the display video image in regions comprising the facial features of the user. Since a large part of facial movement that takes place during a conversation is produced to generate spoken information, there is an inherent correlation between the generated speech and the facial features of the user at any instant. Thus, the regions of the video frame containing facial features of the user, such as the mouth, eyes chin etc. require greater definition.

One or more regions of the video frame are selected either by the user or by a processor according to a point of reference on the video frame (Block 308). The selected regions are generally stored in a memory, and remaining regions of the video frame are de-emphasised (Block 310) so that these regions appear blurred or out-of-focus in the resulting display video image. These remaining regions may be artificially simulated by the display receiving equipment to alleviate data transmission requirements of the system.

Alternatively, key integers of the remaining regions of the video frame can be determined by the user or a processor, and may be utilised to generate a simulation of the remaining regions of the video frame.

The de-emphasised or simulated remaining regions are then recombined with the selected region(s) of the video frame to produce each frame of the display video image (Block 312). Each frame of the display video image is then sequentially displayed to the observer (Block 314).

For convenience, the present invention will now be described in detail with reference to a video communication system, and specifically a video-conferencing apparatus. However, the skilled person will appreciate that the principles, apparatus and features of the invention may find application in various other fields where pseudo three-dimensional images are required.

Figure 4A:
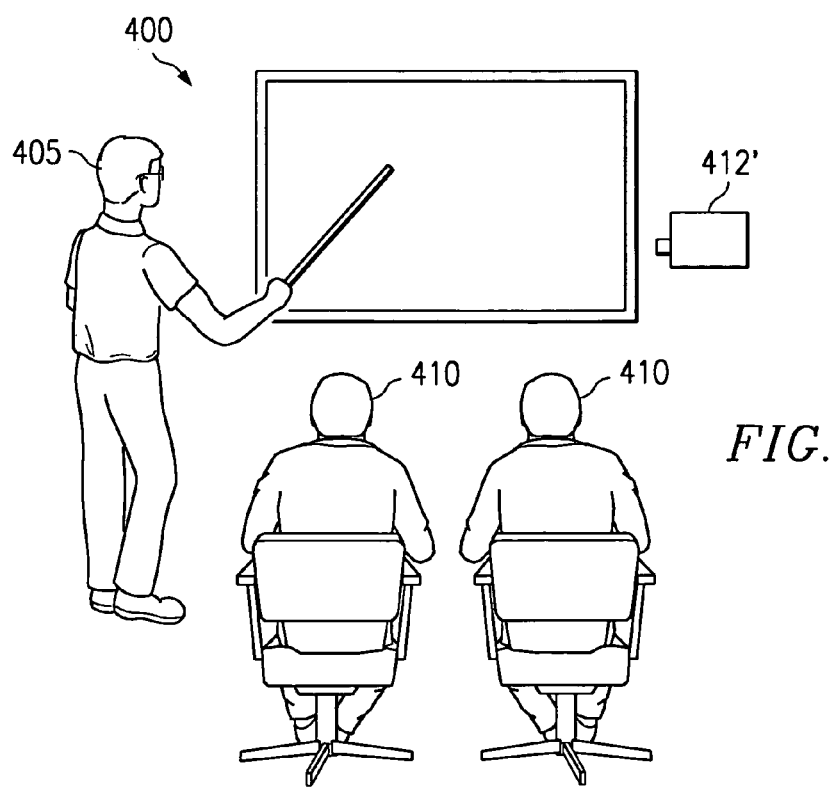
FIGS. 4a–4c show an illustration of the method of FIG. 3 utilised in a video-conferencing system.
Figure 4B:
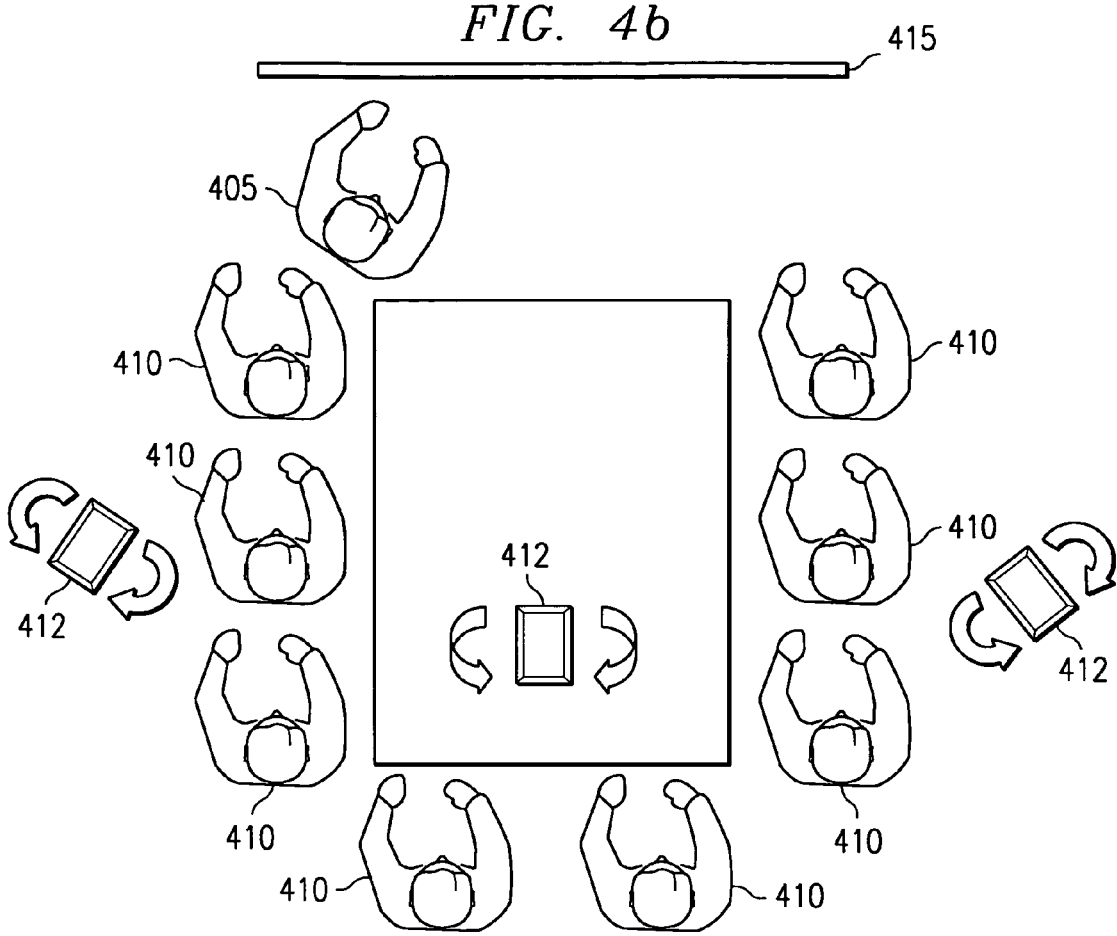
Figure 4C:
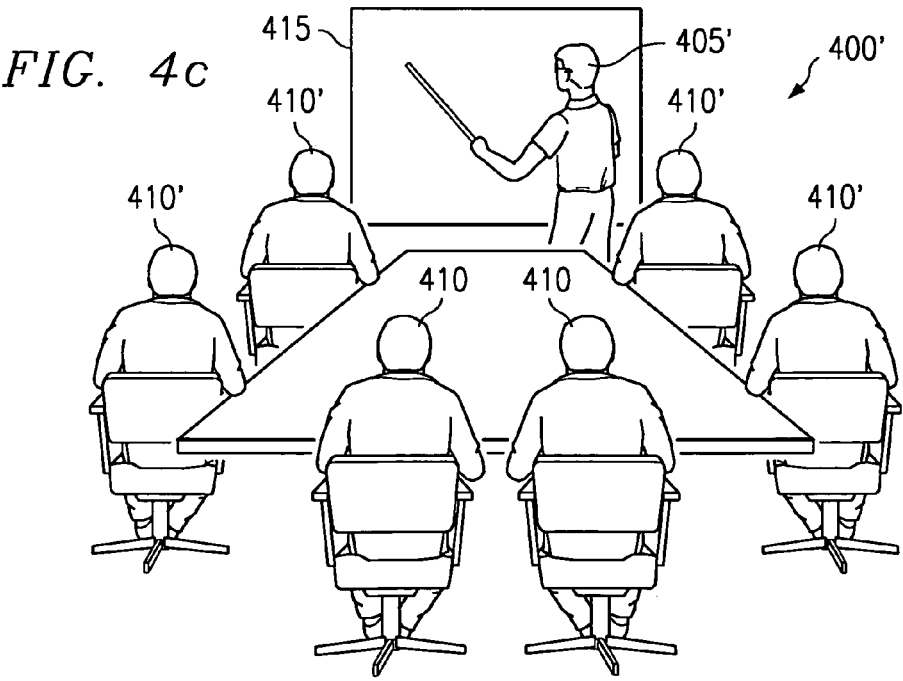

FIGS. 4a–c illustrates a typical video-conferencing scenario in which participants 410 at a first location, (generally denoted 400) are in audio/video communication with the participants 410' at a second location, (generally denoted 400').

Referring to the first location 400 illustrated in FIGS. 4a and 4b, a video camera 412 is utilised to monitor the first location during the video conference. FIG. 4b illustrates three alternative locations for a single video camera 412. It will be apparent to the skilled person that the system may utilise any one, or a combination of more than one of these and other video camera 412 locations. In particular the video camera 412 is utilised to monitor the active entity 405, or instantaneously active participant (i.e. person speaking or giving presentation), at the first location and is directed at, and focused on, the active entity 405. However, generally due to the large field of view and depth of field of the camera 412, other participants 410 and surrounding and background features at the first location will be captured by the camera 412 while it monitors the active entity 405.

Referring now to the second location 400' illustrated in FIG. 4c, the participants 410' in the second location will observe a display video image generated from the scene captured by the camera 412 on a screen 415. More particularly, the participants will observe a display video image of the active entity 405 and other objects within the camera 412 field of view.

When the display video image includes an image of the active entity 405, it has been found that participants 410' derive significant information from the facial regions. In fact it has been found that participants 410' are better able to comprehend the audio component (i.e. speech) when regions, particularly around the mouth and eyes, of an active entity 405 are well defined and the resolution of the display video image in these regions is good. In particular it is known that participants 410' are better able to determine the speech of the active entity 405 if the instantaneous shape of the mouth can be determined.

Co-pending European Patent Application No. 97401772.5, filed 23 Jul. 1997 and assigned to Texas Instruments France, describes a video communication system which utilises this concept by updating the data associated with the facial regions of the active entity 405 in the display video image more frequently than surrounding regions.

Figure 5:
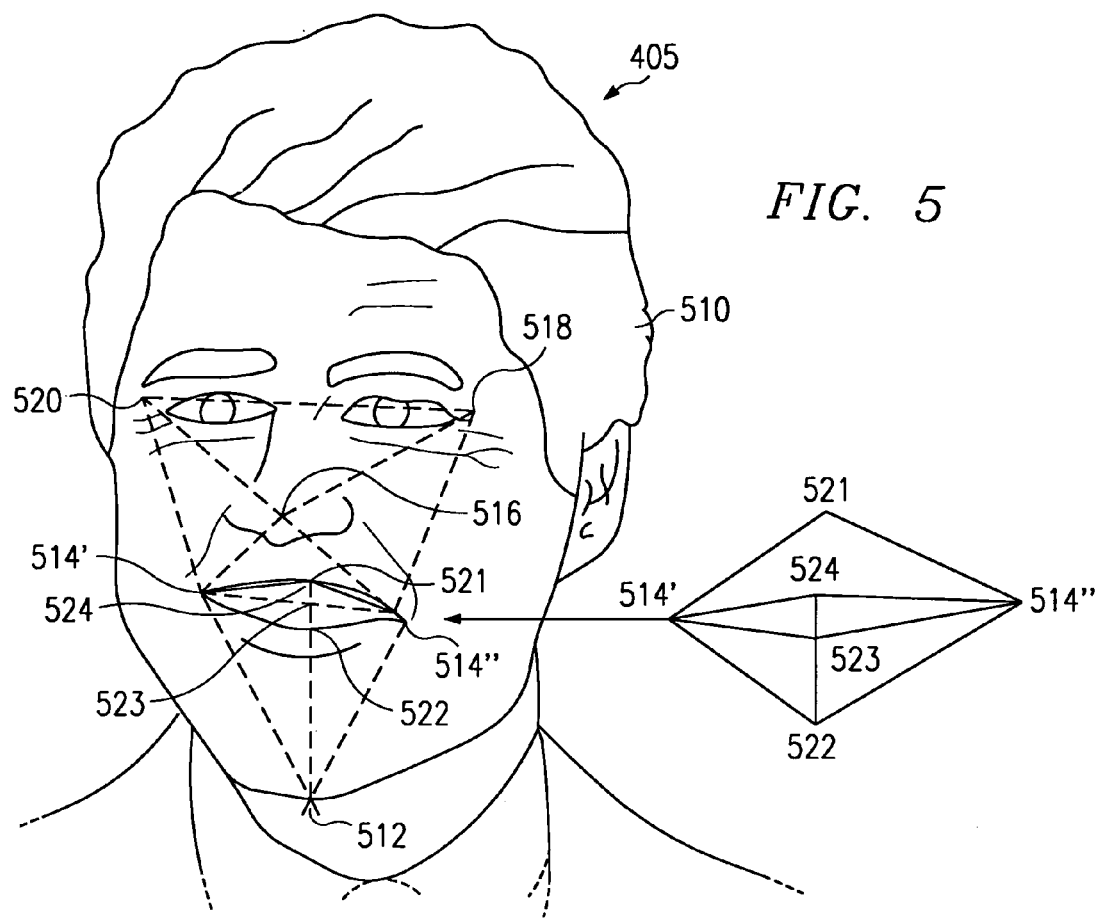
FIG. 5 illustrates the division of the head and shoulder portion of an active entity into blocks of pixels for use in the method of FIG. 3.

FIG. 5 illustrates the head and shoulder region of an active entity 405 monitored by the video camera 412 as described in the teachings of co-pending European application No. 97401772.5.

Preferably, a processor selects integers corresponding to predetermined facial features. For example, the selected integers in FIG. 5 may be the chin 512, opposing edges of the mouth 514' and 514" respectively, the nose 516, and the outer edge of each eye 518 and 520 respectively.

The video image may be divided into substantially triangular regions or blocks of pixels. Each of these regions is represented by an eigen phase. Regions where motion is likely to be frequent (i.e. the background) but which assist the participants 410' little in their comprehension of the audio data (speech) comprise a larger area of pixels than other regions. Conversely, for regions from which provide participants 410' gain much assistance in the comprehension of the audio data (e.g. mouth, chin, eyes, nose) comprise a smaller area of pixels. Therefore, eigen phases for video data corresponding to regions enclosed by the integers 512, 514, 516, 518, 520 are representative of a smaller area of pixels than eigen phases corresponding to an area of other regions.

Since observers will tend to focus on the information bearing facial regions 512, 514, 516, 518, 520, 521 of the active entity 405 other adjacent facial features, such as for example the ears, need not be refreshed as frequently. Furthermore, as observers of the display image generally focus on the information bearing portion of the facial regions of the active entity 405, other regions of the display image can be less well defined without detriment to the observer.

In fact it has been discovered that these regions can be de-emphasised to generate a display image that is analogous, when observed by the participants 410', to someone observing an image of himself in a mirror. It has further been found that an image in which the information bearing facial regions are sharply in focus, and other regions are de-emphasised generates a so-called "Mona-Lisa" effect whereby it appears to each participant 410' that the active entity is looking directly at that participant 410'.

Operation of a video communication system 600 according to a preferred embodiment of the present invention will now be described with reference to FIGS. 6–16. For convenience, the schematic illustration of the video communication system 600 will be described in terms of a transmitting portion 610 and a receiving portion 650. However, it will be understood by the skilled person that generally operation of the video communication system 600 will require both the transmitting portion 610 and the receiving portion 650 to be capable of both generating and transmitting video data, and receiving and converting the video data to generate a display video image.

The transmitting portion 610 includes a video camera 412, camera actuation device 614, image plane module 616, video quantization module 618, coding module 620, pre-processing module 622, loop filtering circuit 624, motion estimation module 626, memory 628, compression module 630, and audio quantization module 632.

The receiving portion 650 comprises a video display 652, dequantization module 654, decoding module 656, post-processing module 658, loop filtering module 660, motion estimation module 662, memory 664, and decompression module 666. It should be understood that various components may be capable of performing dual functions. In particular the transmitting portion 610 and/or the receiving portion 650 will preferably be in the form of a transceiver that is capable of operating in a transmitting or receiving mode. It will further be understood that the transmitting portion 610 and the receiving portion 650 are capable of data communication via a transmission medium 699 that may comprise a "hard-wired" electrical connection, a fibre optic connection, or a wireless connection.

Figure 8A:
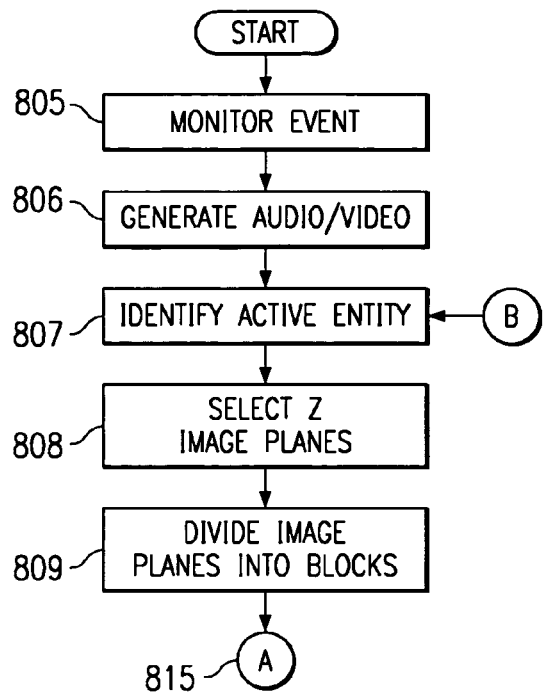
FIGS. 8a–8b are block diagrams illustrating the operation of the transmitting portion and the receiving portion of the video conferencing system of FIGS. 4a–4c.
Figure 8B:
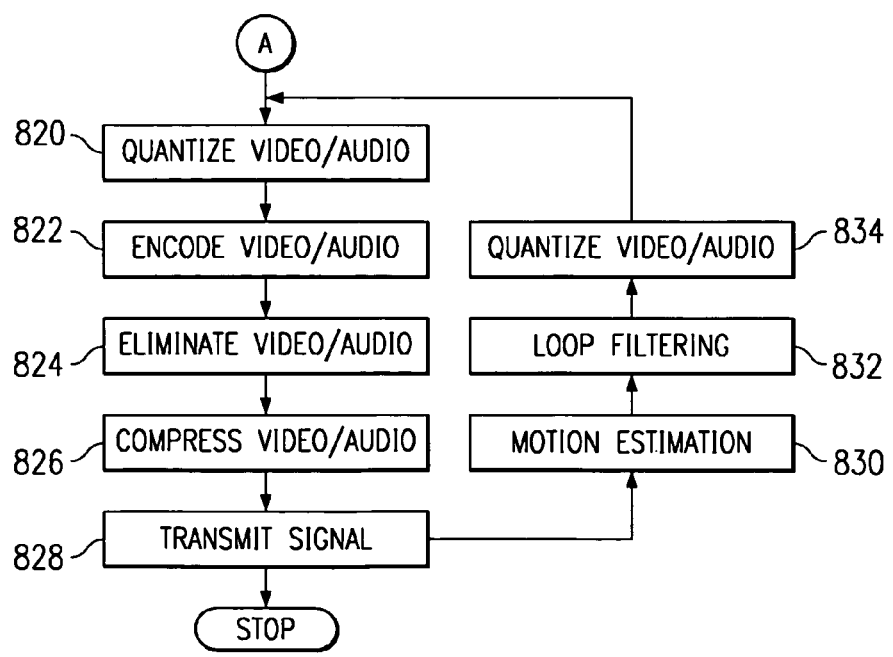

Referring now to FIG. 8a, the video camera 412 monitors the environment in which the video communication system 600 is located (Block 805) and generates a signal (Block 806) that is representative of the audio and video data content of the monitored environment. Next, the camera actuation device 614 will determine the location of an instantaneously active entity 405 within the environment (Block 807).

Such communication systems generally utilise a number of strategically placed microphones, which can be used by the camera actuation device 614 to determine the position of the active entity 405 in the environment by a triangulation technique. Alternatively, the camera actuation device 614 can be triggered by movement since the active entity 405 (e.g. a person speaking to a group) will generally emphasise his speech with, for example hand movements.

Figure 6A:
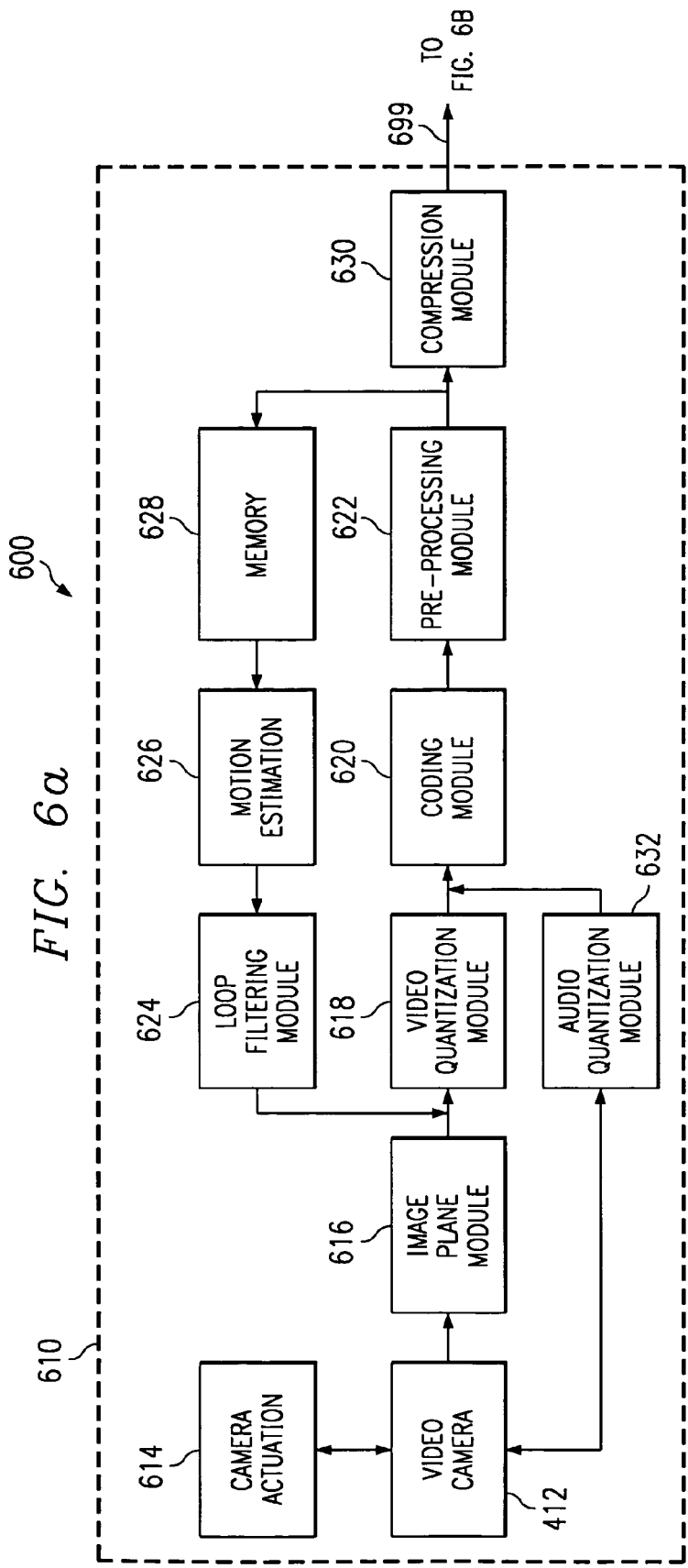
FIGS. 6a–6b illustrate the transmitting portion and the receiving portion respectively of the video conferencing system of FIGS. 4a–4c.
Figure 6B:
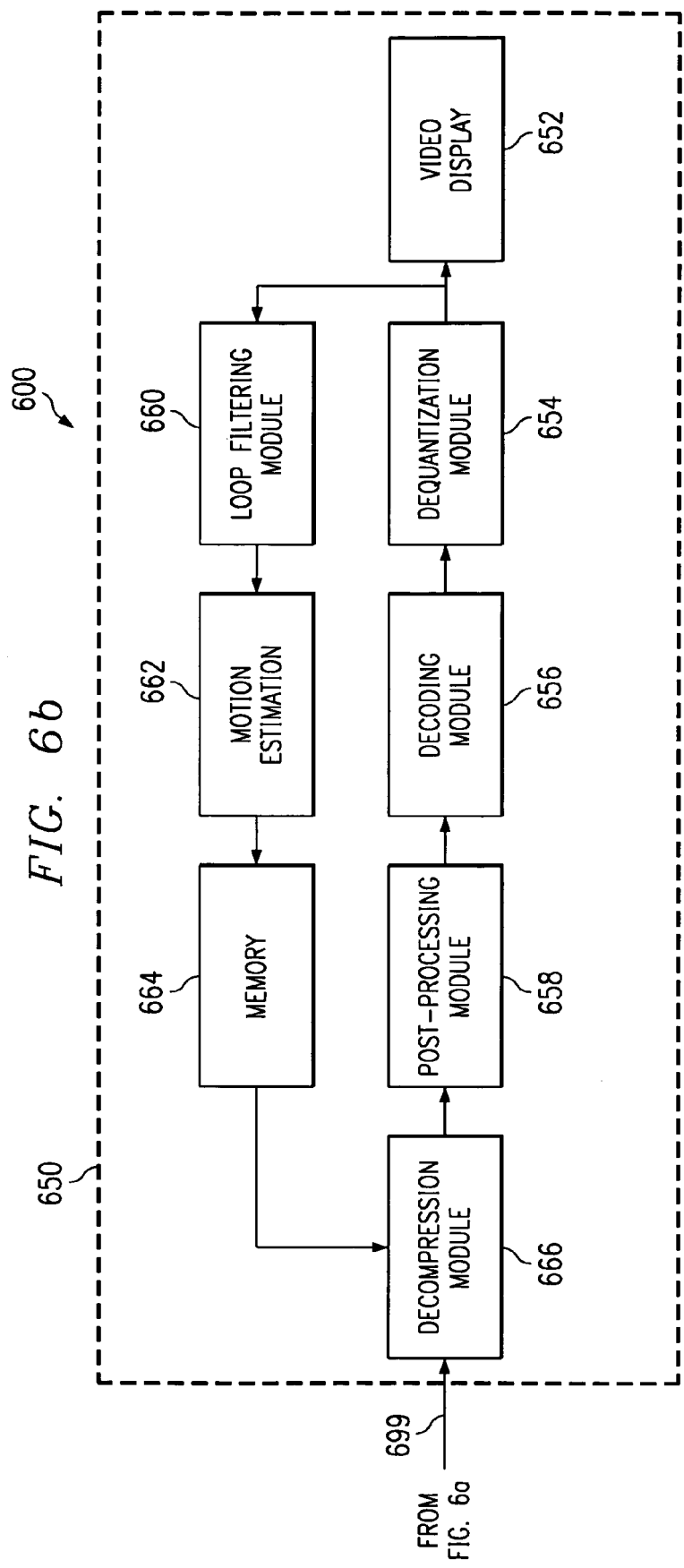

Having determined the active entity 405 in the environment, the actuation device 614 directs the camera 412 to the active entity 405 and monitors the immediate environment surrounding the active entity 405. The image plane module 616 then divides the event monitored by the video camera 412 into a plurality of image planes (Block 808). The image plane module 616 determines the position of significant features in the monitored environment relative to both other significant features and the camera 412. As illustrated in FIG. 6b, the image plane 4 module 616 divides the monitored image into a number of blocks of pixels (Block 809), each block corresponding to a region of the image at an image plane (or different distance from the camera 412). It will be appreciated that the image plane module 616 may select image planes between the active entity 405 and the camera 412, and also select image planes for significant background features behind the active entity 405. Data for each of the blocks of pixels representing an object in an image plane (i.e. corresponding to each of the significant features) is then stored as a look-up table in the memory 628.

Alternatively, the video communication system 600 may comprise a plurality of cameras 412 each directed at a separate region of the monitored environment. Thus, the camera actuation device 614 actuates the appropriate camera 412 for the area in which the active entity 405 is present.

Preferably, the video communication system 600 initially monitors a scene prior to participants 410 being present therein. Consequently, on future reference to the look-up table created for a particular environment the system 600 will know that, for example, a chair is located between the table and the camera 412.

Figure 7:
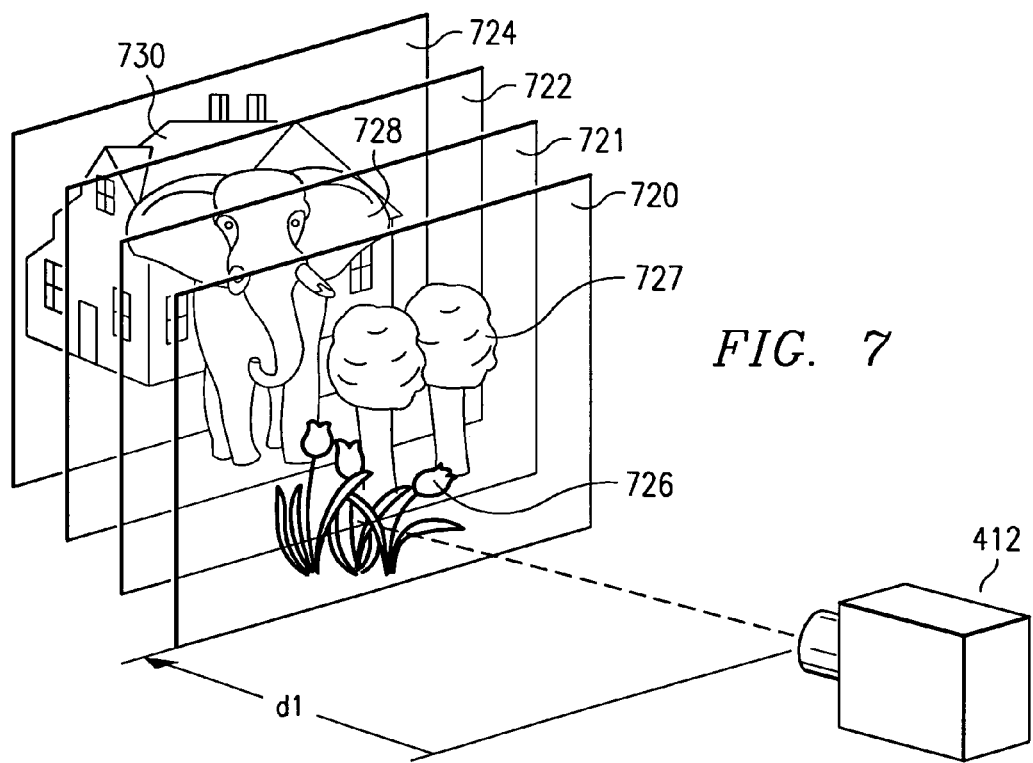
FIG. 7 schematically illustrates a method of determining the relative image planes forming the video display image.

Referring briefly to FIG. 7, each image plane 720,722,724 is representative of a different distance between the camera 412 to a selected significant feature in the monitored environment. Consequently, at a later instant if a further feature were to pass, for example, between the object 726 (flowers) and the object 728 (elephant), such as a person the image plane module 616 may introduce a further image plane 721 between the image planes 720 and 722.

Alternatively, where the video communication system 600 is frequently utilised in the same environment, and significant features within the environment are consistent, such as for example tables, plants, pictures etc., the image planes for these features may be entered into a look-up table stored in memory 628 or 664 memory 664. On each occasion that the communication system 600 is utilised the image plane module 616 initially determines whether each of the significant features is present, and whether any further features have been introduced. Where further features have been introduced since the previous operation of the video communication system 600, the image plane module 616 may generate further image planes by determining the position of the new significant features relative to known significant features within the environment.

Next quantization module 618 sequentially selects each of the blocks received from image plane module 616 according to its relative significance within the monitored image (Block 820). For example, the block containing the information bearing portion of the facial features of the active entity 405 will have a greater importance than less significant features of the active entity 405, and these less significant features of the active entity 405 will in turn have greater importance than background features. The quantization module 618 assigns video data received from the image plane module 616 to a predetermined quantization level (N.B. bits of the video data generally correspond to a pixel of the image monitored by the video camera 412).

The quantization module 618 is further connected to coding module 620, which receives the quantized video data and encodes each block of pixels (Block 822).

The pre-processing module 622 receives the encoded video data from the coding module 620 and eliminates the randomly generated noise (block 824) that may cause single pixel errors originating from the video camera 412. Subsequent compression of this noise will increase the data transmission requirements of the system 600 and waste data bandwidth of the transmission medium. Although simple low pass filtering can reduce the noise, it generally results in blurring of the resulting video image. Therefore, more complex filtering techniques are used (linear or non-linear filtering) in order that the noise generated by the video camera 412 is reduced, while preserving the resolution of the resulting display video image.

The compression module 630 receives the encoded and pre-processed video data and performs a compression process to compress the video data (Block 826). The operation of the compression module is described in more detail below. The compressed video data is then transmitted (Block 828) via the transmission medium 699 to the receiving module 650, but is also stored in memory 628 to assist with reducing the data content of subsequently transmitted frames of the video image.

In typical operational situations, the background and various features monitored by the video camera 412 remain substantially stationary from one frame period of the video image to the next frame period. However, movement of a feature between subsequent frame periods will cause pixels reproducing that feature to move as a block.

The encoded video data stored in memory 628 is used by motion estimation module 626 to generate motion vectors (Block 830) that estimate the position of the each pixel or block of pixels according to the position of that pixel or block of pixels in a preceding frame.

Following the generation of motion vectors by motion estimation module 626, a further improvement in the quality of the video image is obtained by reducing large errors in the prediction data and estimation vectors (Block 832). This is achieved by loop filtering module 624 that performs a loop filtering process when using "intraframe" coding techniques.

Referring now to the receiving portion 650, compressed and encoded video data is received from the transmitting portion 610 via the transmission medium 699. The received video data is decompressed at decompression module 666. However, the compression algorithms implemented by video communication systems may generate "mosquito noise" in the video data that causes artefacts in the resulting video image. Mosquito noise can be attributed to excessive quantization of the video data resulting in the elimination of important high frequency information along contours in the video image (e.g. the edge between a face and the background). Post-processing module 658 provides a reduction in the effects of "mosquito noise" by post-processing of the video data prior to the display of the video image.

Following post-processing the video data is passed via decoding module 656 and dequantization module 654 to video display 652 for generation of the video image.

It is preferred that motion estimation and loop filtering be performed by the transmitting module 610 in order that unnecessary bits of data do not utilise bandwidth that may be more effectively utilised by bits of data that change from frame-to-frame. However, motion estimation can also be performed at the receiving portion 610.

When implemented in a video conferencing application, the observer will focus on a single object (active entity 405). However, in such applications the camera 412 must monitor a scene comprising both the object of interest (active entity 405), but also a number of background or foreground objects (e.g. participants 410, objects 726,727,728,730). Typically, the camera 412 will be focused on the object that is the active entity 405 at a given instant (e.g. participant speaking).

Figure 9A:
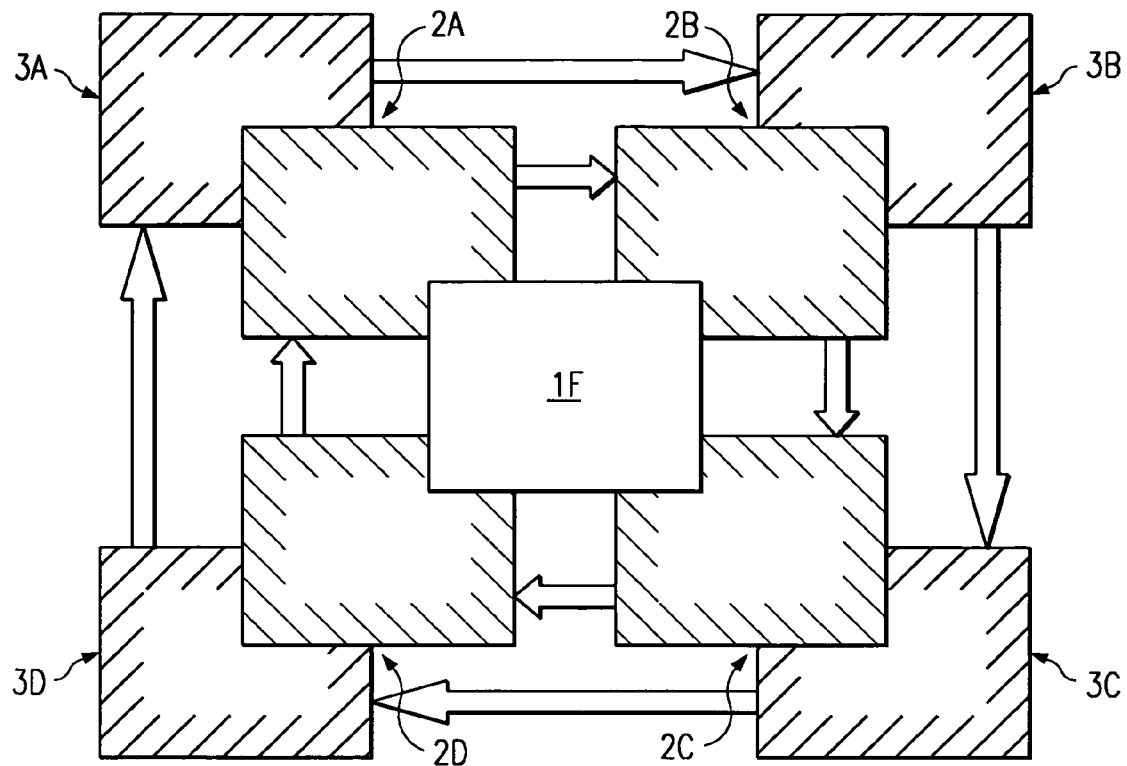
FIG. 9 is a block diagram illustrating a process for refreshing the video display image.
Figure 9B:
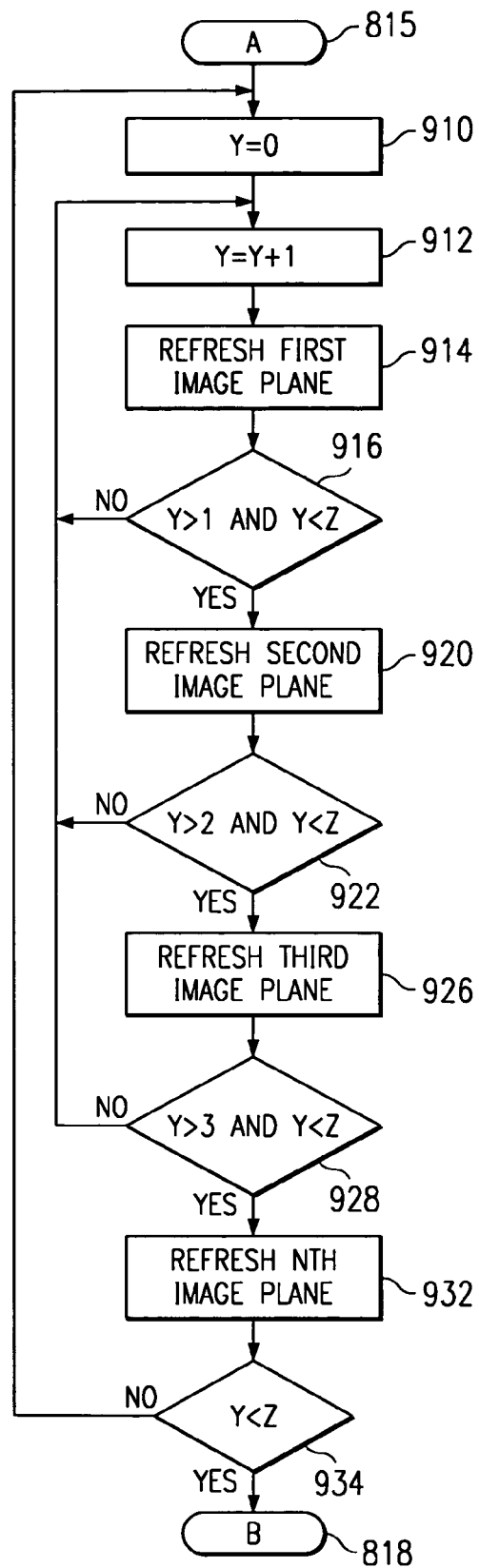

FIGS. 9a–b illustrates a preferred method of refreshing the generated video display images. Referring firstly to FIG. 9a, the active entity 405 is represented by the block 1F. This block of pixels is refreshed on every refresh cycle, the video camera 412 (for example, the cameras described in FIGS. 10–16) select data from only those blocks of pixels that comprise the active entity 405. On every second cycle, blocks of pixels that are representative of objects in the next image plane (N.B. either in front of, or behind, the active entity 405) are refreshed (as indicated by blocks 2A–2D). And on every third cycle, blocks of pixels that are representative of objects in the next image plane are refreshed (as indicated by blocks 3A–3D). This is repeated for Y image planes forming the video display image. Thus, the image planes forming the video display image are refreshed in the sequence: 1F, 1F, 2A–D, 1F, 2A–D, 3A–D, . . . , 1F, 2A–2D, 3A–D, . . . YA–D. The refreshing method is illustrated schematically in FIG. 9b.

Referring now to FIG. 9b, a counter (not shown) is set to zero (Block 910) either when the system 600 is initialised, or when the camera actuation device 614 identifies a new active entity 405. Next, the counter is incremented by one (Block 912) at the start of the first refresh cycle and the first image plane (1F) is refreshed (Block 914) by replacing the data corresponding to the pixels in the block 1F representing the active entity 405.

If the contents of the counter (Y) are less than the number of image planes selected (Z), at the start of the second refresh cycle the counter is again incremented by one (Block 912). The first image plane is refreshed (Block 914) by replacing the data corresponding to the pixels in the block 1F representing the active entity 405, before the second image plane is refreshed (920) by replacing the pixels in each of the blocks 2A–D.

If the contents of the counter (Y) are less than the number of image planes selected (Z), at the start of the third refresh cycle the counter is again incremented by one (Block 912). The first image plane is refreshed (Block 914) by replacing the data corresponding to the pixels in the block 1F representing the active entity 405, together with the second image plane which is refreshed (Block 920) by replacing the pixels in each of the blocks 2A–D, and the third image plane which is refreshed (Block 926) by replacing the pixels in each of the blocks 3A–D.

This cycle of refreshing the blocks of data representing each of the image planes is repeated until all the image planes have been refreshed. The counter is then reset, and the cycle is repeated. Alternatively, if the active entity 405 changes, the counter is immediately reset to zero and the refresh cycles are re-initialised.

Since objects in the monitored environment or the position of an object may correspond with a previous frame of the video image, corresponding blocks of pixels (1F,2A-20, 3A–3D) can be stored in the memory 664. Typically, the data for each block of pixels representing an object is stored with a pointer which allows the video display 652 to identify and select blocks of pixels for display from a library of such data stored in the memory 664.

Another aspect of the invention will now be described with reference to FIG. 10, which is a schematic that illustrates a camera 2000 that is focused on an object 2011 in a plane of focus 2010. Camera 2000 is a single lens camera for use with the video conferencing system 600, described earlier with respect to FIGS. 6a and 6b, that uses depth disparity to create an impression of a 3D image at the video display 652. The video conference system 600 captures, stores and pre-processes the image of a person(s) and/or object and their relative position to background objects/scenes. By recreating the depth disparity between the person (s) and the background objects and scene at the receiver, the system 600 creates an impression of 3D presence (telepresence) to a remote viewer. For purposes of the following description, camera 2000 is connected to the video conference system 600 of FIG. 6a in place of camera 2000.

Camera 2000 has independent focusing optics 2001 and a focal plane 2002, arranged such that the focal axis of the camera 412 and the plane of focus 2010 are arranged to be approximately at a point between the eyes of the person speaking/participating in a video conferencing session, such as speaker 405 or one of participants 410. The focal length of the camera 2000 is adjusted to gain maximum depth information regarding the person speaking/participating in the video conferencing session.

The pixel information recorded on focal plane 2002 by a CCD or CMOS imager (not shown) is digitised and scanned out to a memory array 628 at a line & frame rate that is adequate to prevent flicker at the receiver. Each frame is temporarily stored in a separate part of the memory 628. Using digital signal processing techniques the pixels in each frame that represent the features of the speaker and those representing background objects/scenes are separated and transferred to independent temporary memories.

The analysis is conducted on a frame by frame basis to identify and track the outline of separate objects. In the simple case of a single person the outline of the head/ shoulders is identified by the change in colour/contrast versus the background. In a similar manner objects in the background are be identified. There are a number of known DSP techniques for identifying and separating objects, so this procedure will not be further described here.

Figure 10:
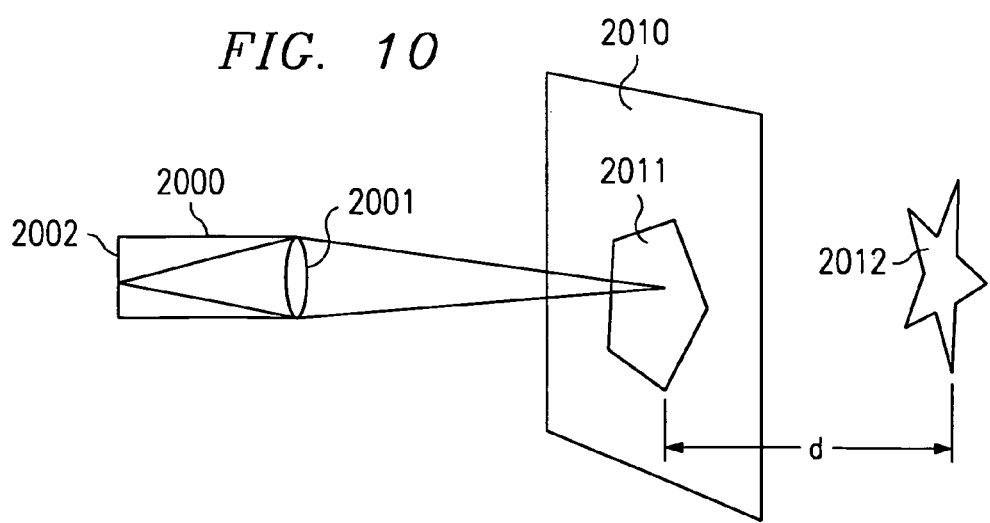
FIG. 10 is a schematic that illustrates a camera that is focused on an object in a plane of focus.
Figure 11:
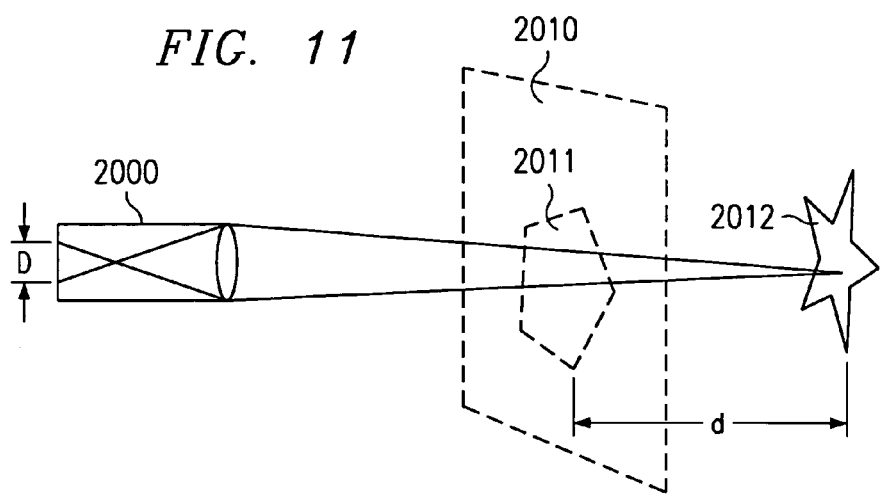
FIG. 11 is a schematic that illustrates how objects beyond the plane of focus of the camera in FIG. 10 appear defocused by an amount corresponding to the depth disparity, according to an aspect of the present invention.

FIG. 11 is a schematic that illustrates how objects beyond the plane of focus 2010 of the camera 2000 in FIG. 10 appear defocused by an amount D corresponding to the depth disparity (d), according to an aspect of the present invention. This characteristic is used in the receiving portion of the video conferencing system to create an impression of 3D presence (telepresence) to a remote viewer. Images representing background objects, such as object 2012, are sent separately to the receiving portion of the video conferencing system, as shown in FIG. 6b. Using digital signal processing techniques, background object 2012 is defocused by an amount equivalent to dispersion distance (D). Dispersion distance D correlates to depth disparity (d) of the background image 2012 that is representative of the depth of background object 2012 from object 2011. Other background objects (not shown) are defocused according to their corresponding depth disparity.

The pixel information representing the person speaking/ participating in the video conferencing session (represented by object 2011) is added back into the modified information representing the background objects and stored back in the main memory 628. The composite image thus formed is displayed to the remote viewer on display 652. The procedure is repeated for subsequent frames.

Figure 12:
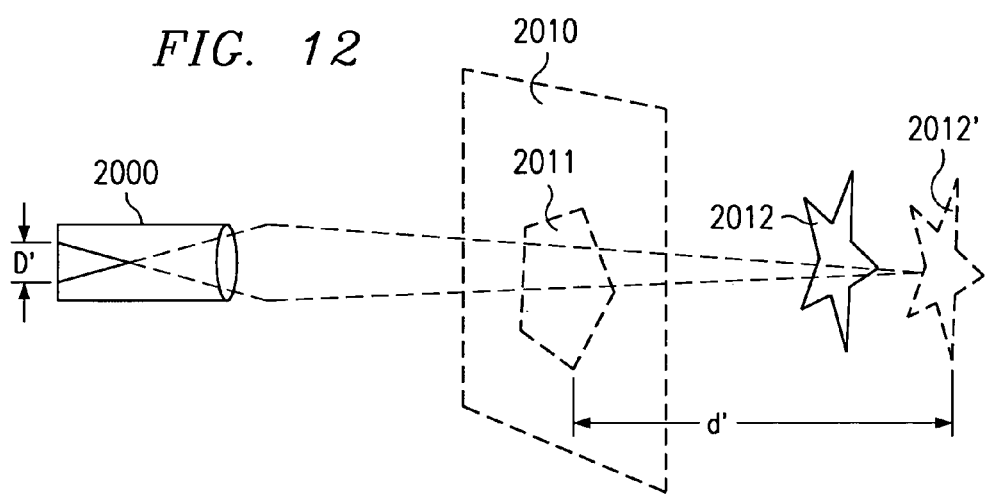
FIG. 12 is a schematic that illustrates how a different depth disparity results in a different amount of defocusing, according to an aspect of the present invention.

FIG. 12 is a schematic that illustrates how a different depth disparity d' results in a different amount of defocusing, or dispersion distance D'. Since the dispersion distance (D) of an image of the background object is representative of the distance (d) of the background object from the person (object 2011), the apparent depth disparity of an object can be varied by varying the amount of defocusing, or dispersion distance D. The result of such a transformation is to change the effective focal length of the camera for the person speaking/participating in the video conferencing session and the background objects. The amount of depth disparity and thus the 3D effect can thus be altered by changing the value of D in response to a depth disparity parameter N. Depth disparity parameter N is provided by the image plane module 616'. Additionally, depth disparity parameter N can be modified by the receiving system of FIG. 6b. For example, an observer of video display 652" can direct processing module 622 to increase or decrease the 3D effect; this in turn results in depth disparity parameter N being increased or decreased, respectively. Of course, in a scene with multiple (m) background image planes, there will be a plurality of depth disparity parameters N(m), corresponding to each image plane.

Using digital signal processing techniques the video conferencing system 600 can further enhance the image of the person speaking/participating in the video conferencing session by amplifying 3D visual queues (shadows, curvature, texture and depth disparity) prior to addition to the background information.

Since the reconstruction of the image at the receiver is dependent on the recreation of the depth disparity, and not stereoscopic imaging, an image can be captured and reconstructed using one camera only. The information can then be stored or transferred to the video compression module 630' for further reduction or transmitted as a single image to the receiving terminal.

As discussed earlier, the image of the speaker 405 or participant 410 can be transmitted separately from images of background objects, such as object 2012. Background object 2012 is defocused in response to a depth disparity parameter N and recombined with the image of speaker 405 or participant 410 to form a single composite image in the receiving system of FIG. 6b. Alternatively, the image of the speaker 405 or participant 410 can be separated from images of background objects, such as object 2012. Background object 2012 is defocused in response to a depth disparity parameter N and recombined with the image of speaker 405 or participant 410 to form a single composite image in the transmitting system of FIG. 6a prior to being transmitted. The resultant composite image is then transmitted to the receiving system of FIG. 6b.

Since there is one focal plane in camera 2000, each image frame that is scanned out of the camera has the person object 2011 in focus whilst background object 2012 is out of focus due to depth disparity that is proportional to the distance of the background object from the plane of focus. The amount of defocus present in background object 2012 depends on the focal length of camera 2000. After background object 2012 is separated from an image frame, the depth disparity of object 2012 is enhanced to create the illusion of 3D, as discussed above. This may be done by adding "noise" to the image of object 2012 to soften sharp edges. Alternatively, each pixel of the image of background object 2012 can be individually dispersed over a circular area having a diameter (D(n)), corresponding to the desired depth disparity (d(n)) for object 2012. Furthermore, the position of sharp edges may be oscillated in space (i.e. the position of an edge may be alternated between two or more positions in space for alternate frames of the display video image)

Figure 13:
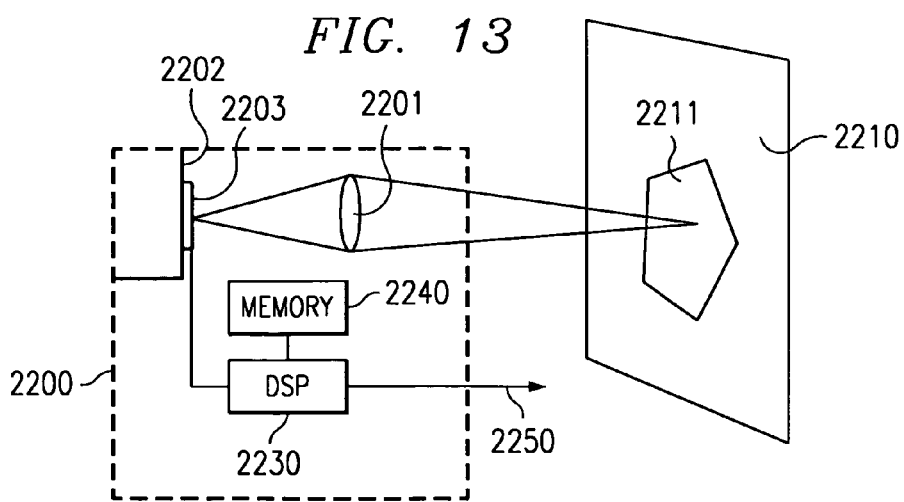
FIG. 13 is a block diagram of a camera that contains a digital signal processor for processing images according to aspects of the present invention.

FIG. 13 is a block diagram of a camera 2200 that contains a digital signal processor (DSP) 2230 for processing images according to aspects of the present invention. Camera 2200 has independent focusing optics 2201 and a focal plane 2202, arranged such that the focal axis of the camera aligns with the plane of focus 2210 that contains object 2211. Pixel information is recorded on focal plane 2202 by a CCD or CMOS imager 2203 and is digitised and scanned out to a memory array 2240 at a line & frame rate that is adequate to prevent flicker at the receiver. DSP 2230 contains software that is stored in memory 2240 for performing some or all of the image processing steps performed by modules 614'–632'. Image data is transmitted from camera 2200 via output signal line 2250.

Alternatively, DSP 2230 may be programmed to separate pixels relating to an image of the speaker 405 or participant 410 from images of background objects, such as object 2012. In this case, only the images of the speaker 405 or participant 410 are transferred to the video conferencing system after the background images have been transferred once and stored in memory 619'.

The invention allows the focal length of a camera to be electronically varied to modify the perceived depth of focus for different objects. Using this technique, the depth disparity of a video conferencing scene can be optimised. Since depth disparity is a key contributor to the impression of 3D, by varying the depth disparity parameter (N(m)) for the person and background objects, the impression of presence within a video conferencing scene can be increased. Since the system relies on depth information to reconstruct the 3D scene, (i.e. the offset of image planes in FIGS. 2a–2c) the system can capture, store and transmit only one image of the scene.

An advantage of the invention is that it leads to the possibility of using one camera for capturing and pre-processing video information from a video conferencing scene, whilst optimising the visual queues required to create an impression of 3D presence when the image is reconstructed at the receiver.

Another advantage of the invention is that it leads to a reduction in the amount of data that is required to be captured, stored and transmitted to achieve high quality, 3D-like video conferencing.

Another aspect of the present invention will now be discussed with reference to FIG. 14, which is a schematic that illustrates two separate cameras 2100 and 2105 focused on an object 2111 in a plane of focus 2110. The equipment comprises two independent cameras 2100, 2105 with two independent focusing optics 2101, 2106 arranged such that the distance between the focal centres of the optics is approximately equal to the distance between the eyes of an observer 16. The focal axis 2103, 2108 of each of the cameras is arranged to approximately point towards the person(s) participating in the video conferencing session, represented here by object 2111. Each camera 2100, 2105 can be similar to camera 2000 or to camera 2200, for example.

A classic method of capturing stereoscopic information is to rotate a camera around an object located at the centre of the arc swept by the camera (alternatively one can have multiple cameras located on the arc). The rotation of the camera through the arc is used to take into account the requirement that the focal length of the lens remains constant, otherwise one view of the individual/object would be larger/smaller than another. The different frames/views taken by the camera(s) includes information that relates to the sides of the object. The individual frames (all of which are in focus) can then be used to construct a 3D model of the object. However, if the object is not at the centre of the arc varying degrees of depth disparity will exist in the individual images.

Figure 14:
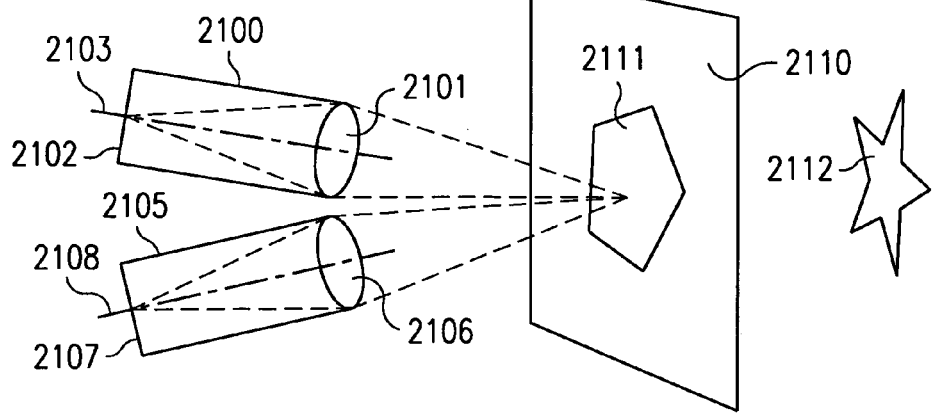
FIG. 14 is a schematic that illustrates two separate cameras focused on an object in a plane of focus.
Figure 15:
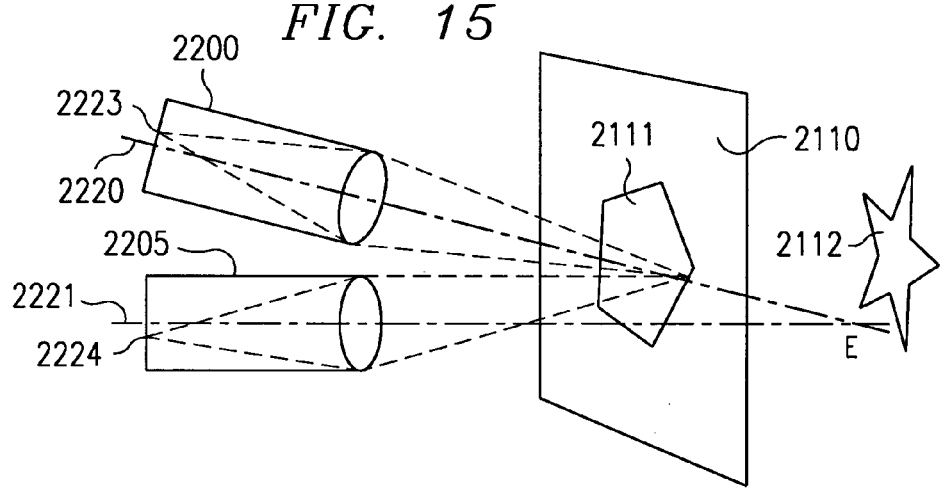
FIG. 15 is a schematic that illustrates how an alignment error can be corrected when the mechanical plane of focus of the two cameras of FIG. 14 is offset from the optical plane of focus, according to an aspect of the present invention.

FIG. 15 is a schematic that illustrates how an alignment error can be corrected when the mechanical plane of focus E of the two cameras of FIG. 14 is offset from the optical plane of focus 2110, according to an aspect of the present invention. Such misalignment will result in an image pixel 2223 captured on camera 2200 being at a different relative position then a corresponding image pixel 2224 captured on camera 2205. To compensate for such an error in alignment between the cameras, a delay can be introduced between the line synchronisation pulses used to scan information out of the CCD (or CMOS) imager 2203 of the cameras to the camera memory 2201. The offset is defined to be the delay required to align key features of the face of active entity 405 or participant 410, such as the corners of the mouth and eyes, for example, within the two separate images at the plane of focus.

Since the reconstruction of the image at the receiver is dependent on the recreation of the depth disparity and not stereoscopic imaging, as described earlier, the images from each of the cameras can be combined to a single image. A key difference between this case and the single camera case is that information relating to the side of the object is maintained. Digital signal processing techniques can also then be used to maintain and enhance other 3D visual queues, such as texture and shadows and curvature, for example, of the facial features of the person that is within plane of focus (i.e. active entity 405 or participant 410).

Figure 16:
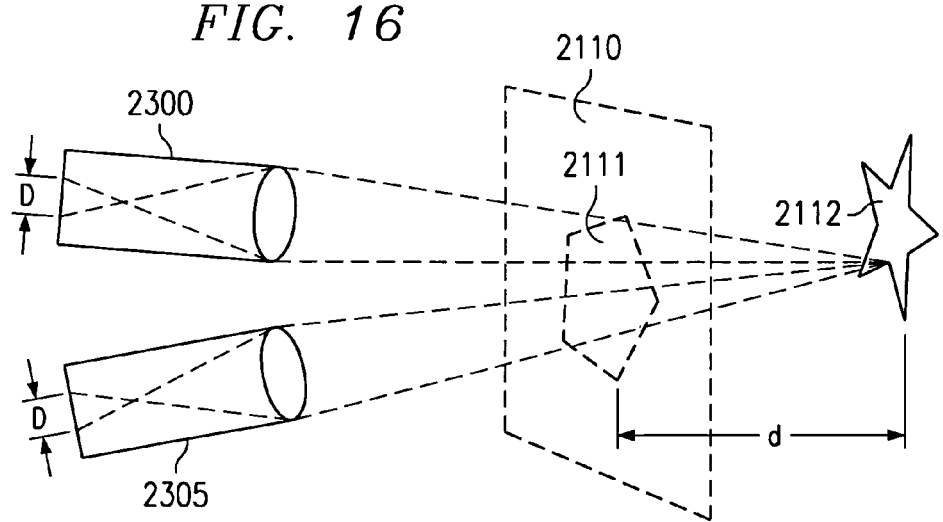
FIG. 16 is a schematic that illustrates how objects beyond the plane of focus of the cameras in FIG. 14 appear defocused by an amount corresponding to the depth disparity, according to an aspect of the present invention.

The depth disparity is maintained within the resultant 2D image by capturing and storing background images 2112 that are out of the field of vision 2110. FIG. 16 is a schematic that illustrates how an object 2112 beyond the plane of focus 2110 of the cameras in FIG. 14 appear defocused by an amount D corresponding to the depth disparity (d), according to an aspect of the present invention. The pre-processed information corresponding to the background objects can be stored, or transferred to the video compression system for further reduction or transmitted as a single image to the receiving terminal.

The cameras capture the depth disparity d associated with a 3D image instead of stereoscopic disparity. Since the information to reconstruct the 3D scene is the offset of image planes (d in FIG. 16) misalignment of the mechanics of the camera can be compensated for when scanning the images from the CCD or CMOS imagers.

As described with reference to FIGS. 10–16, the objects within each frame of the monitored image are identified by the DSP 2230. Typically, fast Fourier transform algorithms will be used to determine the outline of each object due to differences in the luminosity, contrast, or texture of the objects in each image plane. However, the outline of the objects may also be determined due to the relative position of the pixels. In particular, pixels defining the outline of an object will be closely spaced and a sharp contrast will occur between these pixels and adjacent pixels defining background objects.

Once the objects within each frame of the video image have been identified, each of the blocks of pixels representing an object may be processed individually. Preferably, the blocks representing each image plane will be stored in the memory for use in the generating subsequent frames of the display video image.

Figure 17A:
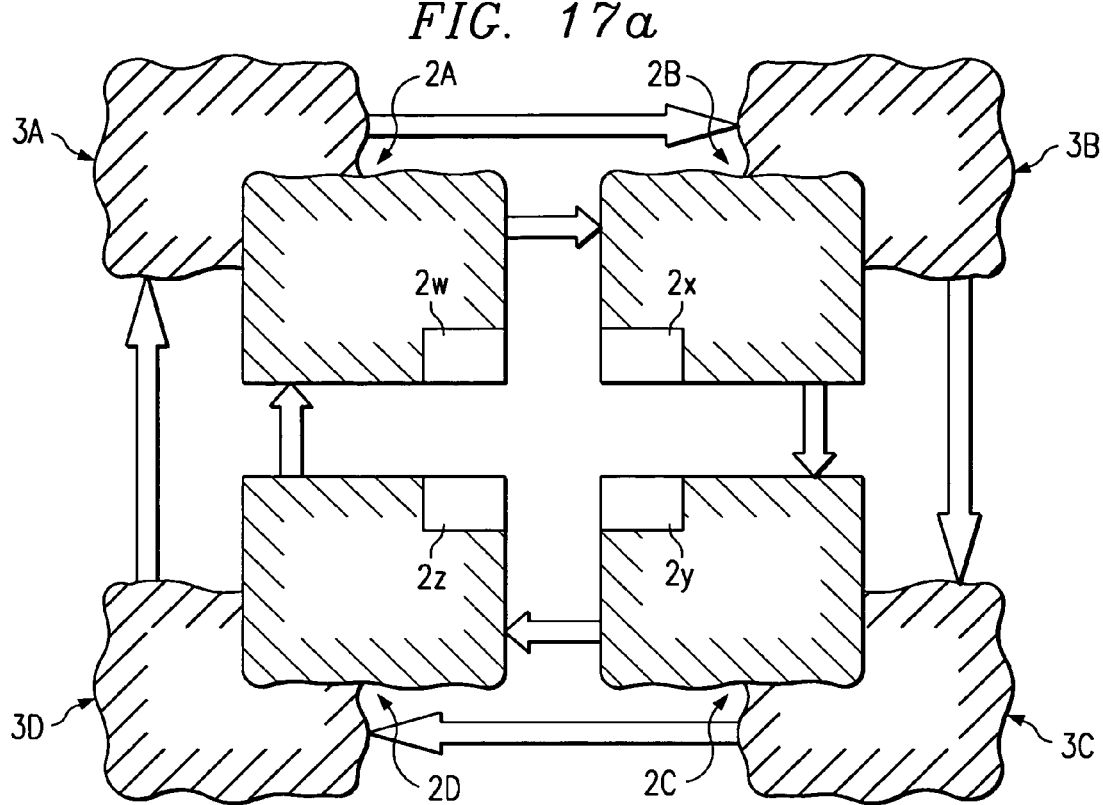
FIGS. 17a–17b show the formation of image planes from blocks of pixels.

FIG. 17a illustrates a plurality of blocks of pixels 2A–2D representing a second image plane, and a blocks of pixels 3A–3D representing a third image plane. Since the objects represented by the blocks of pixels 2A–2D will be partially obscured by the foreground object represented by the block of pixels 1F, portions (2w–2z) of the blocks of pixels 2A–2D will provide no additional information. Such portions (2w–2z) may be excised to alleviate the data content requirements of the signal transmitted to the receiving portion 650 of the video communication system 600.

Figure 17B:
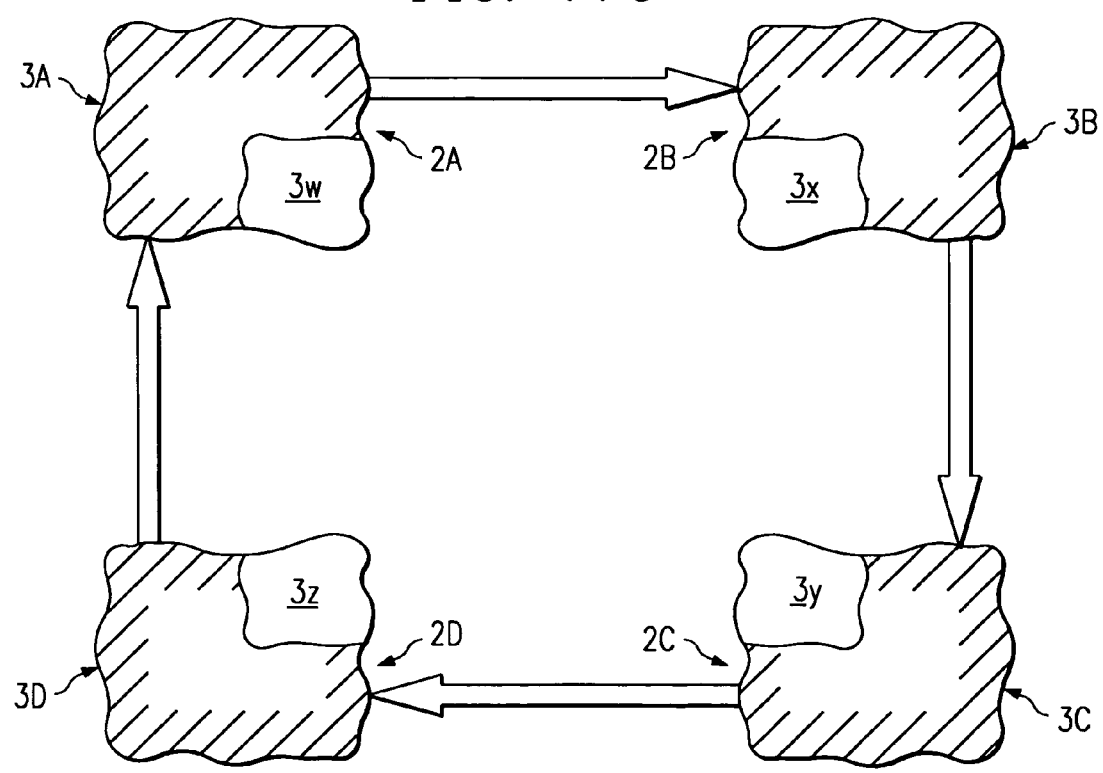

This feature is further illustrated in FIG. 17b where a plurality of blocks of pixels 3A–3D representing a third image plane 3 is partially obscured by foreground objects represented by blocks of pixels 2A–2D in the second image plane 2. Therefore, portions (3w–3z) of the blocks of pixels 3A–3D will provide no additional information. Such portions (3w–3z) may be excised to alleviate the data content requirements of the signal transmitted to the receiving portion 650 of the video communication system 600.

As previously described herein, the pixel information recorded at the focal plane is digitised and scanned to memory array 628. The data representing each block of pixels, or object, is assigned a unique reference that comprises information on the position of the block of pixels in the horizontal and vertical planes, together with information relating to the depth disparity (d). Although the imager captures a sequence of frames (as described in relation to FIGS. 10–16) in which the objects in each image plane are focused or sharp, the video communication system of the present invention is capable of changing the amount of disparity according to the position of the observer. Consequently, the display video image viewed by each observer will comprise an object in focus (1F), while objects in preceding and/or succeeding image planes will be de-emphasised according to their distance relative to the object in focus (1F).

The system of the present invention is also capable of the providing a different display video image for several observers, each viewing the display video image at a different location since the receiving portion tracks the observers vision and adapts the depth disparity accordingly. Since foreground objects will hinder the observers vision of background objects the data relating to the foreground objects stored in the memory 628 will comprise "holes" for redundant information.

It has been found that if the observer views an object in the foreground (1F) of the display video image, the edge of background objects (3A–3D) will be highlighted if sharp. Therefore, it is necessary to de-emphasise these edges in order that the observers perception of the display video image is not effected. Although the observers perception of the video display image will not be detrimentally affected if the redundant regions (2w–2z) of the second image plane retain well defined edges, edges of the redundant regions (3w–3z) of the third image plane, and of redundant regions in each subsequent image plane will have a detrimental effect.

According to another aspect of the present invention, similarities in the colour, luminance and/or intensity of objects may be removed to alleviate bandwidth requirements of the video communication system. This is possible as the observer utilises differences in the relative luminance, intensity, and colour to assist in determining the relative positions of objects in space. Inherent spatial similarities (e.g. distant objects, background scenery, or sky), temporal similarities (e.g. stationary objects), and/or similarities in the colour, luminance or intensity between objects in successive frames of the video image may be removed using the digital signal processor 2230. Thus, the data content of the signal generated and transmitted by the transmitting portion 610 may be reduced if data indicative of these features is removed. This data can be artificially re-introduced by a further digital signal processor (not shown) in the receiving portion 650.

This leads to a reduction in the amount of data that is required to be captured, stored and transmitted to achieve high quality, 3D-like video conferencing.

The frames of the generated video display image must be periodically refreshed. Conventional display systems refresh the whole video display image on each refresh cycle. However, as previously discussed herein, large regions of each frame of the video display image correspond with the preceding frame. It has also been found experimentally, that observers obtain the greatest information content from the area of the video display image on which they are focussed, and the information content of other regions of the image is less important. Therefore, it has been found it is possible to refresh other regions of the video image less frequently, while maintaining a video display image that is of good quality.

It is possible to divide the frames of the monitored video image into a plurality of blocks using the method of the invention disclosed herein, and more particularly with the cameras 412 of described in relation to FIGS. 10–16. Therefore, blocks of pixels that are representative of the active entity 405 in the display image are more frequently refreshed than blocks of pixels that comprise, for example, background objects 410. This approach enables valuable bandwidth to be saved in applications such as, for example, the video-conferencing system of FIG. 5.

The video display 652 may comprise a single projector which projects the video display image onto a wall or screen using front or rear projection techniques. It has been found digital projectors, for example, of the type utilising DLP technology from Texas Instruments Limited are particularly suitable for such applications.

While the present invention has been described by the foregoing detailed description, it will be understood by those skilled in the art that various changes, substitutions and alterations can be made to the disclosed method and system without departing from the spirit and scope of the invention.

What is claimed is:

1. A method for generating a video image of an object comprising the steps of:
   generating video data representing video frames for forming the video image of said object;
   processing said video data by:
      dividing each video frame into a plurality of regions, each region being representative of a portion of said object, at least one of said plurality of regions being predetermined at least one of said plurality of regions and the other of said plurality of regions being remaining ones of said plurality of regions;
      selecting said predetermined at least one of said plurality of regions of the video frame;
      de-emphasising said remaining ones of the plurality of regions of the video frame;
   transmitting video data indicative of said selected at least predetermined one and said remaining ones of the plurality of regions of said video frames to a receiver having a display for displaying said display video image; and
   recombining said regions of each of said video frames to form a display video, said recombining step comprising forming a display video image in which the selected region of the video frame is sharp or well-defined, and remaining ones of the plurality of regions of the video frame are de-emphasised or blurred in accordance with the relative distance between the portion of said object in a remaining one of the plurality of regions respective region of said object and a reference point.

2. The method as claimed in claim 1 wherein said step of selecting said region comprises selecting a region defining a foreground object.

3. The method as claimed in claim 1 wherein said step of selecting said region comprises an observer selecting a region of the object.

4. The method as claimed in claim 1 wherein said step of selecting said region comprises selecting a region of said video frame according to the position of an object relative to at least one other object.

5. The method as claimed in claim 1 wherein said step of selecting said region comprises selecting a region of said video frame defining an active entity.

6. The method as claimed in claim 1 wherein said step of dividing said video image into a plurality of regions comprises dividing said video image into a plurality of regions each defining a focal plane.

7. The method as claimed in claim 6, wherein the step of dividing said video image into a plurality of regions each defining a focal plane comprises dividing said video image into regions wherein each focal plane is representative of a different distance between a respective portion of said object and said reference point.

8. The method as claimed in claim 1, wherein said step of selecting at least a predetermined one of said plurality of regions comprises de-emphasising remaining portions of said video image according to the distance between a respective portion of said object and said reference point.

9. The method as claimed in claim 8, wherein said step of de-emphasising remaining portions of said video image comprises applying greater de-emphasisation to regions of the video image that are representative of portions of the object having a greater distance between the respective portion of said object and said reference point than regions of the video image that are representative of portions of the object having a smaller distance between the respective portion of the object and the reference point.

10. The method as claimed in claim 1 further comprising; artificially generating each remaining region of the video image.

11. The method as claimed in claim 1, wherein said step of generating video data comprises monitoring an object with a video camera to produce one or more video frames.

12. The method as claimed in claim 11, wherein the step of displaying said video image comprises displaying said video frame such that remaining regions of the display video image are less sharp in accordance with the relative distance between said respective portion of said object and said video camera.

13. The method as claimed in claim 1 wherein said step of generating video data comprises generating a sequence of video frames, and said step of displaying said display video image comprises displaying a sequence of video frames.

14. A system for generating a video image of an object comprising;
   circuitry for generating video data representing video frames for forming the video image of said object;
   circuitry for dividing each video frame into a plurality of regions such that each region is representative of a portion of said object, at least one of said plurality of regions being predetermined at least one of said plurality of regions and the other of said plurality of regions being remaining ones of said plurality of regions; and
   means for selecting said at least one of said plurality of predetermined regions from said received video data;
   circuitry for recombining said regions of each of said video frames to form a display video image; and
   a display for displaying said video frames of said display video image such that said selected region is formed as a sharp image, and remaining regions of said display video image are less sharp in accordance with the relative distance between said respective portion of said object and a reference point.

15. The system as claimed in claim 14 wherein said means for selecting are arranged to select a region defining a foreground object.

16. The system as claimed in claim 14 wherein said means for selecting are arranged such that an observer can select a region of the monitored object.

17. The system as claimed in claim 14 wherein said means for selecting are arranged to select a region of said video frame according to the position of an object relative to at least one other object.

18. The system as claimed in claim 14 wherein said means for selecting are arranged to select a region of said video frame defining an active entity.

19. The system as claimed in claim 14 wherein said circuitry for dividing said video image into a plurality of regions is arranged for dividing said video image into a plurality of regions each defining a focal plane.

20. The system as claimed in claim 19, wherein said circuitry for dividing said video image into a plurality of regions each defining a focal plane is arranged for dividing said video image into regions wherein each focal plane is representative of a different distance between a respective portion of said object and said reference point.

21. The system as claimed in claim 20 further comprising;
    circuitry for de-emphasizing remaining regions of said display video image.

22. The system as claimed in claim 21, wherein said de-emphasising circuitry is arranged for de-emphasising remaining portions of said video image according to the distance between a respective portion of said object and said reference point.

23. The system as claimed in claim 22, wherein de-emphasising circuitry is arranged for applying greater de-emphasisation to regions of the video image that are representative of portions of the object having a greater distance between the respective portion of said object and said reference point than regions of the video image that are representative of portions of the object having a smaller distance between the respective portion of the object and the reference point.

24. The system as claimed in claim 21 further comprising;
    means for artificially generating each remaining region of the video image.

25. The method as claimed in claim 21 wherein the circuitry for generating video data comprises a video camera for monitoring an object to produce one or more video frames and the display is capable of displaying said video frame such that remaining regions of the display video image are less sharp in accordance with the relative distance between said respective portion of said object and said video camera.

* * * * *